Patented June 24, 1941

2,246,529

UNITED STATES PATENT OFFICE 2,246,529

XYLYL METHYL CARBINAMINE

Fred P. Nabenhauer, Somerton, Pa., assignor to Smith, Kline & French Laboratories, Philadelphia, Pa., a corporation of Pennsylvania No Drawing. Application June 7, 1938, Serial No. 212,390

12 Claims. (Cl. 260—570.8)

This invention relates to a new composition of matter and more particularly to a new composition of matter which has been found to have, among other uses, desirable therapeutic characteristics rendering it advantageous for use variously as a chemical intermediate, as a medicinal preparation for the treatment of various conditions of the human and animal system, etc.

The new composition, among other uses, will be useful, for example, as an intermediate for the preparation of various chemical compounds such, for example, as isoquinoline compounds.

More particularly, from the therapeutic standpoint the new composition in accordance with this invention in various forms will be found to be advantageous for affecting the central nervous system; for producing effects simulating stimulation of the sympathetic nervous system and for effecting contraction or relaxation of smooth muscle depending upon the function of the sympathetic nervous system; for effecting vasoconstriction, and for producing general and local effects resultant therefrom, respectively. In general, the effects produced adapt it for the treatment of any condition where general or local effects resultant from affecting the central or sympathetic nervous system, respectively, are therapeutically effective and desirable.

From the broad standpoint the composition contemplated by this invention will comprise certain primary and secondary alkyl amines derived from certain benzyl alkyl carbinamines, generally speaking, by the substitution on the benzene ring of a methyl group; and the organic and inorganic salts thereof. Variously the new composition contemplated here from the broad standpoint will be made apparent from the following structural formula:

Formula A

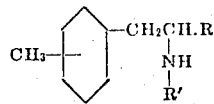

where the methyl group on the ring is in either the ortho, meta or para position, R is a methyl, ethyl, propyl or isopropyl group and R' is hydrogen or a methyl group; and organic and inorganic salts of said compounds.

From the therapeutic standpoint the bases comprising the primary and secondary amines disclosed above will have advantages as indicated, as will also the non-toxic organic and inorganic salts thereof, produced with organic and inorganic acids yielding non-toxic ions, as for example, the hydrochlorides, sulphates, oleates, tartrates, etc.

From the more specific standpoint generally and from the therapeutic standpoint broadly, this invention will be made apparent by the following structural formula:

Formula B

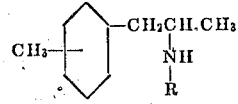

where the methyl group on the ring is in either the ortho, meta or para position and R is hydrogen or a methyl group; and non-toxic organic and inorganic salts of said compounds.

From the therapeutic standpoint the primary and secondary amines will be advantageously used in admixture with an extender or excipient, or in solution in a light mineral oil to a concentration of, for example, 0.25–5.0%. The non-toxic salts will lend themselves to extension in water, as in aqueous solution. The bases may be locally applied, for example, to the mucosa, in vapor form by inhalation extended with air.

The new composition of matter in accordance with this invention from the broad and specific standpoints may be prepared in any desired manner, no claim to any particular method of preparation being made. The method of preparation will be made obvious by the following illustration for the preparation of specific primary and secondary amines and salts thereof.

By way of illustration, for the preparation of the new composition, for example, alpha ortho, meta and para xylyl methyl carbinamines, I prefer to use the alpha ortho, meta or para xylyl methyl ketones, the preparation of which is known to the art.

Proceeding, one mole of alpha ortho, meta or para xylyl methyl ketone, depending upon the amine to be prepared, is slowly added to five moles of formamide, heated to a temperature of 165–170° C. The ketone may be added to the formamide alone or, if desired, mixed with one mole of formic acid. On the addition of the ketone to the formamide the formyl derivative of the desired ketone is formed along with the products according to the following reaction:

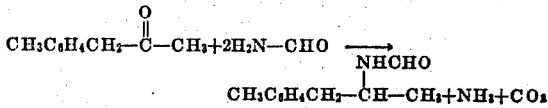

The above reaction is well known as the Leuckart synthesis. On completion of the reaction, unreacted formamide is removed with water and the formyl derivative is then hydrolyzed by boiling with an excess of constant boiling hydrochloric acid or with 50% sulphuric acid. The free base is then liberated by the addition of an excess of alkali, as sodium hydroxide, and is then separated with or without the use of a solvent, as benzene or ether, may be dried with caustic potash, if desired, and purified by distillation, preferably under reduced pressure.

The alpha-xylyl methyl carbinamines so obtained will be found to be oils having the following boiling ranges:

|  | °C. |
|---|---|
| Alpha-ortho-xylyl methyl carbinamine | 220–223 |
| Alpha meta-xylyl methyl carbinamine | 217–218 |
| Alpha para-xylyl methyl carbinamine | 222–224 |

The salts of the alpha-xylyl methyl carbinamines, prepared as described above, will be readily prepared by exactly neutralizing the base with a suitable acid, such as sulphuric, hydrochloric, oleic, tartaric, etc. and removing the water by evaporation. If desired, solutions of the salts may be made and used without separation.

For the preparation of the N-methyl derivatives of the alpha-xylyl methyl carbinamines, the same procedure as that described above may be followed, except that N-methyl formamide is used in place of formamide. If desired, N-methyl amines and formic acid may be used. The reaction will proceed as follows:

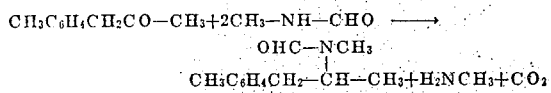

The formyl derivative obtained by the reaction is hydrolyzed by boiling with an excess of constant boiling hydrochloric acid or with 50% sulphuric acid and the free base is liberated by the addition of an excess of alkali, as sodium hydroxide, and is then separated, with or without the addition of a solvent, as benzene or ether, and may be dried with caustic potash, if desired, and purified by distillation, preferably under reduced pressure.

The N-methyl alpha-xylyl methyl carbinamines obtained will be found to have the following boiling ranges:

|  | °C. |
|---|---|
| N-methyl alpha ortho-xylyl methyl carbinamine | 228–230 |
| N-methyl alpha meta-xylyl methyl carbinamine | 225–228 |
| N-methyl alpha para-xylyl methyl carbinamine | 229–230 |

The salts of the N-methyl derivatives may be prepared by neutralizing in aqueous solution with a desired organic or inorganic acid, such as sulphuric, hydrochloric, oleic, tartaric, etc. The salts of the N-methyl derivatives will be found to be somewhat difficult to obtain in a dry form, for use generally and medicinally. However, dryness is not essential.

In using the broad and specific embodiments of this invention for therapeutic effect, generally speaking the bases will be used locally, while the salts, which may also be used locally, will be preferable for oral or parenteral administration. The compounds may be conveniently extended for use, either by admixture with an excipient, as lactose or other suitable excipient, or a solvent, as water, in the case of the salts or an oil, as a mineral or vegetable oil in the case of the bases. Thus, for example, the alpha-xylyl methyl carbinamines and the N-methyl derivatives thereof may be dissolved, for example, in an oil, as a vegetable or mineral oil, and applied for local vasoconstriction, as for shrinking the nasal mucosa, in the form of a spray. Again, since the bases are volatile at ordinary room temperature, they may be suitably supported in an inhaler and applied for shrinking the nasal mucosa by inhalation. The salts of the alpha-xylyl methyl carbinamines and of the N-methyl derivatives may be applied in aqueous solution for producing mydriasis or, as a spray, for shrinking the nasal mucosa. Again, for parenteral administration, for example, for affecting the central nervous system, or producing relaxation or contraction of smooth muscle, or general systemic vasoconstriction, aqueous solutions of the salts of the alpha-xylyl methyl carbinamines or of the N-methyl derivatives thereof, may be parenterally administered and such may be orally administered, or if desired, the compounds may be administered in tablet form in admixture with any suitable excipient, as for example, lactose, sucrose, starch, etc., together with a binder, as for example, gelatin.

In use of the new composition in accordance with this invention for medicinal function or therapeutic effect the dosage or amount administered will depend upon a number of factors. Thus, particular dosage will depend upon the condition of the patient to be relieved, the quantitative or qualitative effect to be produced, the specific composition selected for administration, the mode of administration and the patient's individual reaction to the particular composition and mode of administration.

This application is a continuation in part of an application filed by me, Serial No. 143,933, filed May 21, 1937, and of an application filed by me, Serial No. 92,847, filed July 27, 1936, which in turn was filed as a continuation in part of an application filed by me Serial No. 51,478, filed November 25, 1935.

What I claim and desire to protect by Letters Patent is:

1. A medicinal remedy for affecting the central nervous system; for producing effects simulating stimulation of the sympathetic nervous system and for effecting contraction or relaxation of smooth muscle depending upon the function of the sympathetic nervous system; for effecting vasoconstriction, and for producing general and local effects resultant therefrom, respectively, comprising essentially a compound from the group consisting of compounds having the following formula:

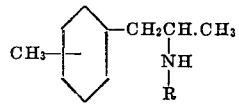

where R is a member of the group consisting of hydrogen and a methyl group, and non-toxic salts of said compounds.

2. A medicinal remedy for affecting the central nervous system; for producing effects simulating stimulation of the sympathetic nervous system and for effecting contraction or relaxation of smooth muscle depending upon the function of the sympathetic nervous system; for effecting vasoconstriction, and for producing general and local effects resultant therefrom, respectively, comprising essentially a compound from the group consisting of compounds having the following formula:

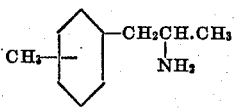

and non-toxic salts of said compounds.

3. A medicinal remedy for affecting the central nervous system; for producing effects simulating stimulation of the sympathetic nervous system and for effecting contraction or relaxation of smooth muscle depending upon the function of the sympathetic nervous system; for effecting vasoconstriction, and for producing general and local effects resultant therefrom, respectively, comprising essentially a compound from the group consisting of compounds having the following formula:

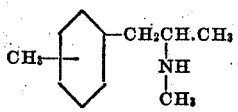

and non-toxic salts of said compounds.

4. A compound from the group consisting of compounds having the formula:

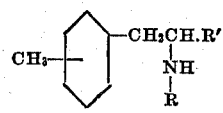

where R' is a member of the group consisting of methyl, ethyl, propyl and isopropyl groups and R is a member of the group consisting of hydrogen and a methyl group; and salts of said compounds.

5. A compound from the group consisting of compounds having the formula:

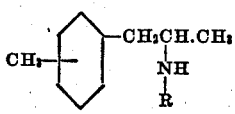

where R is a member of the group consisting of hydrogen and a methyl group; and salts of said compounds.

6. A compound having the formula:

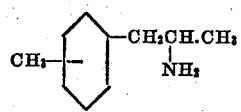

7. A salt of a compound having the formula:

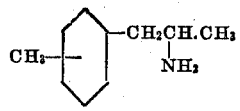

8. A compound having the formula:

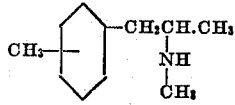

9. A salt of a compound having the formula:

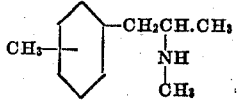

10. A compound from the group consisting of compounds having the formula:

and salts thereof.

11. A compound from the group consisting of compounds having the formula:

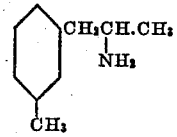

and salts thereof.

12. A compound from the group consisting of compounds having the formula:

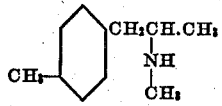

and salts thereof.

FRED P. NABENHAUER.